UNITED STATES PATENT OFFICE.

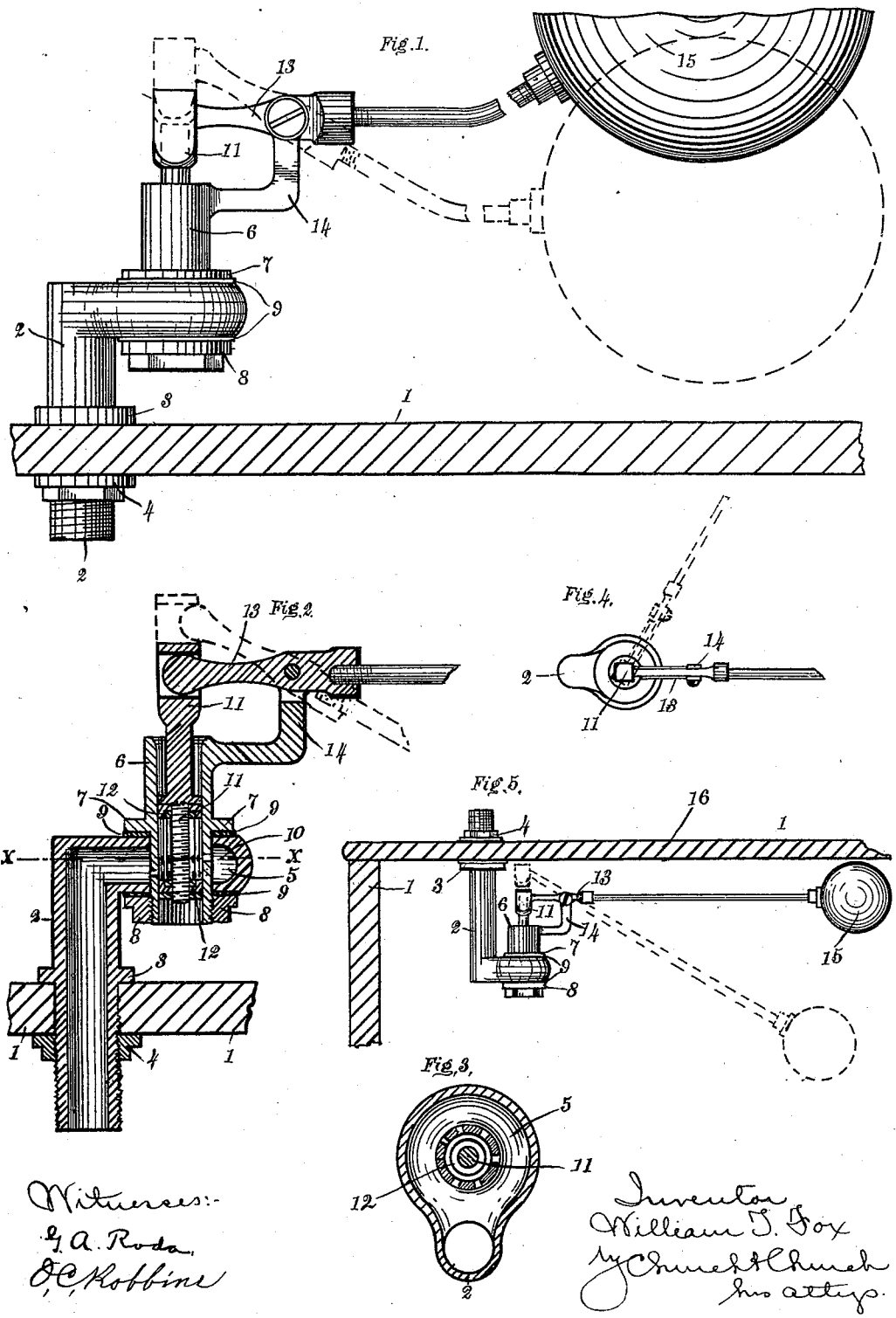

WILLIAM T. FOX, OF ROCHESTER, NEW YORK.

FLOAT-VALVE.

SPECIFICATION forming part of Letters Patent No. 538,772, dated May 7, 1895.

Application filed January 30, 1895. Serial No. 536,680. (No model.)

*To all whom it may concern:*

Be it known that I, WILLIAM T. FOX, of Rochester, in the county of Monroe and State of New York, have invented certain new and useful Improvements in Float-Valves; and I do hereby declare the following to be a full, clear, and exact description of the same, reference being had to the accompanying drawings, forming a part of this specification, and to the reference-numerals marked thereon.

My present invention has for its object to provide an improved form of float-valve, particularly adapted for use in connection with the flushing tanks of water-closets; and it consists in certain improvements in construction and combinations of parts, all as will be hereinafter fully described and the novel features pointed out in the claims at the end of this specification.

In the drawings, Figure 1 is a sectional view of a water-tank, showing my invention applied thereto; Fig. 2, a vertical sectional view of the valve; Fig. 3, a cross-sectional view on the line $x\,x$ of Fig. 2; Fig. 4, a plan view, and Fig. 5 a view of another way of supporting the valve.

Similar reference-numerals in the several figures indicate similar parts.

1 indicates a suitable tank or receptacle in which the valve is used, and 2 the valve support, tubular in form, having a threaded lower end passing through the bottom or side of the tank to which the supply pipe 10 is secured and provided with a collar 3 and an adjustable securing nut 4. The upper end of this support projects at an angle to the portion passing through the tank constituting an extension thereof, and has in it a chamber 5 communicating with the interior, and projecting through said chamber and approximately parallel with the supply pipe is a casting 6 formed with the barrel or tubular body, having a flange 7, while its lower end is threaded and provided with a securing nut 8; said flange and nut serving to confine the barrel in place on the extension permitting its rotary adjustment on the latter, suitable packing 9 being interposed between the flange and nut and the casting, as shown. This barrel is open at both ends and is provided with a series of apertures 10 communicating with the chamber 5, and operating in the barrel is a valve or piston-rod 11 upon which are mounted two adjustable piston heads 12 having cup-shaped packing, as shown. The upper end of the rod has an aperture for the reception of the end of the lever 13 pivoted to an arm 14 on the barrel and carrying at its outer end the hollow float 15. In normal position when the valve is closed, the piston-heads are on opposite sides of the apertures 10 communicating with the chamber 5 so that the pressure of the water is balanced, and when the float drops, the lower piston-head will pass above the apertures 10 and the water may be discharged through the bottom of the valve barrel, as will be understood, the rise of the float by the filling of the tank, depressing the piston-rod and gradually cutting off the supply.

By employing a balanced piston-valve, such as shown, it will be seen that the float may be removed from the valve lever when desired to make repairs in the tank without possibility of the valve being opened by the water pressure. It will also be noted that this valve is constructed of few and simple parts, requires little fitting, and the valve barrel and all the operating parts can be turned around on the support, moving in a horizontal plane, as in dotted lines in Fig. 4, and it will be understood that if the supply pipe entered the tank at the side, said parts could be adjusted in a vertical plane, the lever carrying the float being bent to produce the required movement.

The feature of the support with the chambered extension and the barrel carrying the valve and its operating parts adjustable on said support is desirable whether the specific form of balanced valve shown herein is employed or not, though I much prefer the whole arrangement shown, as I find in practice it is well adapted to the purpose. This arrangement is advantageous also because the valve support can be secured in reversed position on a bridge piece 16 over the top of the tank if desired, and the valve barrel inserted from the other side, as shown in Fig. 5, the detachable fastenings between the said barrel and chamber permitting this.

I claim as my invention—
1. The combination with the hollow support having the chambered extension, of the valve barrel passing through said extension and having the passages communicating with the chamber, the valve rod having the two piston-heads thereon, and the pivoted lever carrying the float and engaging said valve rod, substantially as described.

2. The combination with the hollow support having the chambered extension, of the valve barrel passing through the extension and adjustable thereon, having passages communicating with the chamber, the valve rod, two piston-heads thereon, the lever pivoted to the barrel and engaging the valve rod, and the float on the lever, substantially as described.

3. The combination with the hollow support having the chambered extension, of the valve barrel having the threaded end, and nut, the arm thereon for the lever, and the passages communicating with the chamber in the support, the valve rod, the two pistons thereon, operating in the barrel and the float lever pivoted on the arm, substantially as described.

4. The combination with the hollow support having the lateral chambered extension, of the valve barrel mounted on said extension, having a valve therein, and a float for operating it, said barrel being capable of a rotary adjustment in said extension, and securing devices for holding it in adjusted position, substantially as described.

5. The combination with the support having the apertured chamber, of the tubular casting 6, having apertures 10, flange 7 and nut 8, arm 14, the piston-rod 11 having heads 12, operating in the casting or barrel, and the float lever 13 pivoted on the arm 14 engaging the rod 11 and having the float 15, the whole arranged and operating substantially as described.

WILLIAM T. FOX.

Witnesses:
F. F. CHURCH,
G. A. RODA.